United States Patent Office 3,177,753
Patented Apr. 13, 1965

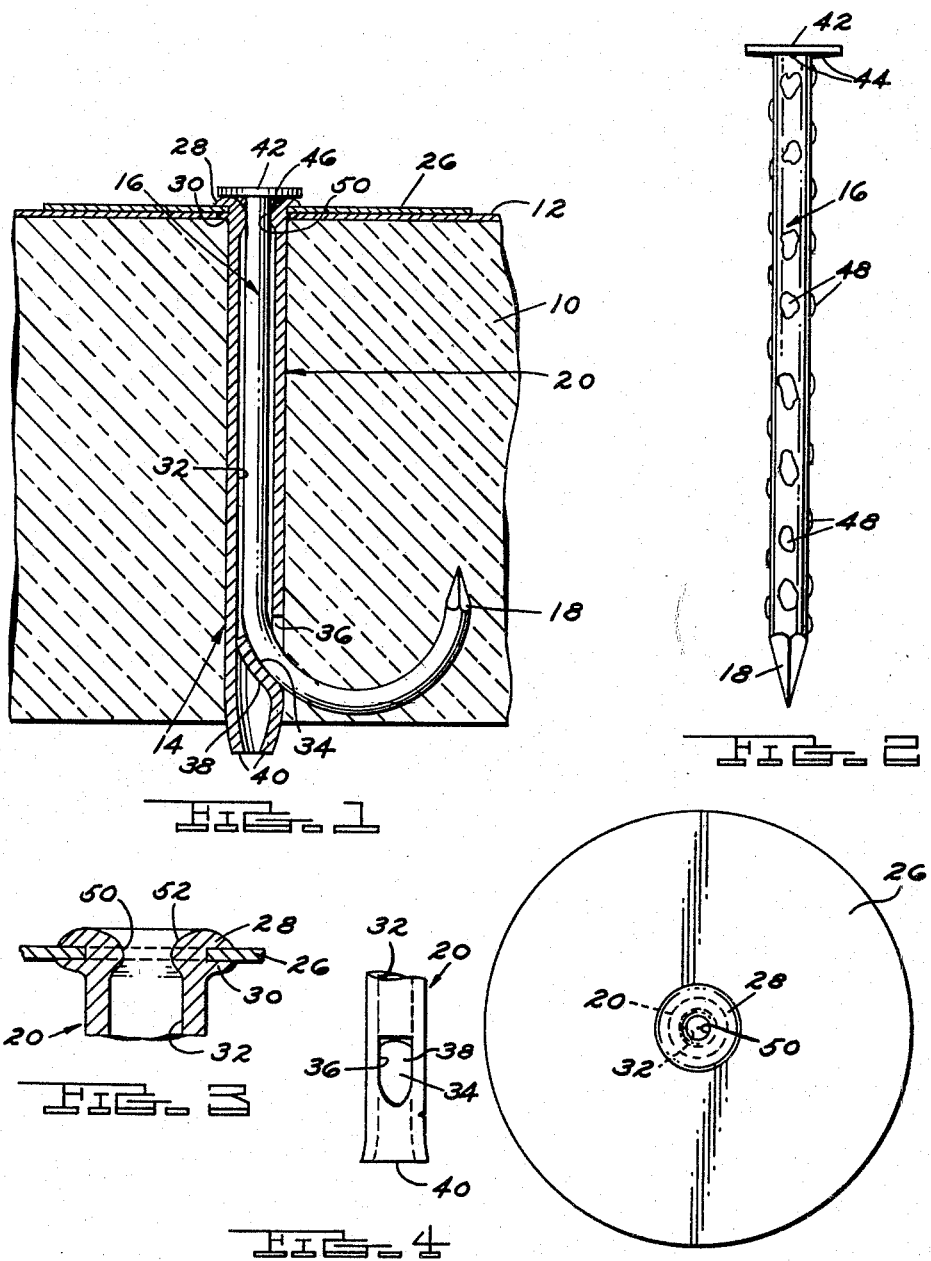

3,177,753
ANCHOR NAIL FASTENER WITH SEALING MEANS
Robert J. Maginnis, Americus, Ga., assignor to Simplex Nail & Manufacturing Corporation, Americus, Ga., a corporation of Michigan
Filed Nov. 19, 1962, Ser. No. 238,611
3 Claims. (Cl. 85—23)

This invention relates to an anchor nail fastener with sealing means.

In the U.S. patent application of Owen, Serial No. 50,935, filed August 22, 1960, an anchor nail fastener is disclosed particularly designed for securing tar paper or other coverings to building panels, such as insulation panels formed of relatively porous materials in which conventional nail fasteners will not hold. Such fastener comprises a tubular body adapted to be driven into the panel and having a relatively large head at one end for limiting penetration of the panel and a side opening aperture adjacent the opposite end with a nail-deflecting surface in the tube adjacent the aperture to deflect a nail driven down through the tube laterally outwardly through the aperture and into the panel. In experimenting with such fastener it has been found that it frequently will allow moisture, rain water, tar and the like to seep into or through the panel along the bore of the tube, thereby either injuring the panel or adjacent structure or disfiguring the underside thereof or a covering that may be applied adjacent such underside.

The principal object of this invention is the provision of an anchor nail fastener of the general character above mentioned but which will prevent moisture, rain water, tar and the like from leaking into the fastener and along the inside of the tube and thereby into the interior or far side of the panel.

Another object of the invention is the provision of a fastener which will automatically effect a seal between the tube and nail when the nail is driven home in the tube.

Another object of the invention is the provision of a fastener of the above character which will form a gasket seal in situ as the nail is driven into the tube.

Still another object of the invention is the provision of a fastener of the above general character in which the nail is coated with a strippable film or coating of plastic or the like, which plastic coating is stripped up the nail toward the head as the nail is driven into the tube, with the stripped coating forming a gasket beneath the head of the nail and between the nail shank and the tube to effect a seal therebetween.

Other objects, advantages, and meritorious features will more fully appear from the specification, claims, and accompanying drawings, wherein:

FIG. 1 is a cross sectional view through an anchor nail fastener embodying the invention, showing the same disposed within a workpiece, such as an insulation panel;

FIG. 2 is a view of a nail adapted for use with the fastener;

FIG. 3 is a cross sectional view through the upper end of the tube body of the fastener showing the constriction of the bore;

FIG. 4 is a front view of the side opening of the tube aperture with a nail projecting therethrough as in FIG. 1; and FIG. 5 is a top view of the fastener shown in FIG. 1.

The fastener disclosed herein is, as mentioned above, particularly suitable for use with relatively porous building panels, such as panels formed of a relatively dense material but with voids therein which prevent the satisfactory utilization of conventional nail-type fasteners. While the fastener is particularly suitable for use with fiberboard panels of the type sold under the trademarks of Tectum fiberboard panels or Insulrock fiberboard panels, the fastener may also be used with other types of board and applications for use with natural wood boards are feasible. The term "board," or "panel" as used herein is intended as a generic expression covering all materials for which the fastener may prove satisfactory. The insulation board or panel for which this fastener has been particularly designed may be of the type made of wood shavings held together by a suitable binder. The fastener may be used to secure waterproof paper, such as tar paper or the like, or other waterproof coverings, upon the insulation board, or to secure two boards together, either one or both of which boards may be dense material having voids preventing use of conventional nail-type fasteners. The fastener may also find use in polyurethane foam or like materials for securing coverings, accessory items, or parts thereto.

The nail may also find utilization in securing shingles or the like to porous roof or siding boards where conventional shingle nails would tend to pull loose. In the event the fastener is used to secure shingles or the like, the length of the tube may be somewhat longer than that indicated in the drawings.

FIG. 1, by way of example in solid outline, shows the fastener in place within a panel or insulation board 10 holding to the upper surface thereof a sheet of tar paper or the like 12. The board or panel 10 is of the aforementioned character comprising a relatively dense material held together with a suitable binder and having voids therein. The panel 10 may be of one piece or may be of two pieces as mentioned in the co-pending application of Owen.

The fastener comprises a nail guide and reflector tube generally indicated at 14 and an anchor nail generally indicated at 16. As shown, the nail guide and deflector member has been driven into the board 10 and the nail 16 has been driven into the nail guide and deflector with its pointed end 18 curled laterally outwardly and upwardly through a side opening aperture 36 in the tube and embedded in the board.

The nail guide and deflector preferably comprises a tube 20 formed of seamless steel tubing. Other forms of tubing may be found to be satisfactory but the seamless steel type has the requisite strength and ridigity suited for the intended purpose herein disclosed. The tube is provided at its upper end with means for limiting its penetration into the board 10 and also for holding the tar paper 12 or other material which is to be secured to the board. Such means preferably comprises an annular flange or head 26 of washer-like shape which is secured rigidly to the upper end of the tube by upsetting the tube wall as at 28 and 30. The connection between the head 26 and the upper end of the tube is such as to prevent rain water, moisture, tar and the like from creeping over the upper surface of the head and down along the outside of the tube wall. This tight joint may be readily accomplished by upsetting the tube wall as shown with the upset portions tightly gripping the head 26 at the opening therethrough through which the tube extends.

The tube is provided with an axial bore 32 which is substantially closed at the lower end by means providing a nail point deflecting surface 34. Such means comprises an inwardly deflected portion of the tube wall. Opposite surface 34 the tube wall is punched to provide the side opening aperture 36, with the severed wall portion being laid back inwardly of the tube to provide the upwardly and outwardly facing surface 34. Such inwardly bent wall portion is indicated at 38.

The lower end of the tube is substantially though not completely closed. In cutting off the tube 20 from the length of tubing from which it is formed, the shearing dies may be so provided that the tube walls are bent toward each other as at 40. If desired such lower end of the tube may be completely closed.

The upper end of wall portion 38 bears against the side wall of the tube opposite aperture 36 such that as the point 18 of a nail is driven downwardly through the tube, and engages the surface 34, the wall of the tube in abutment with portion 38 will tend to prevent such portion from collapsing downwardly as the nail point is deflected laterally outwardly through the aperture 36.

The nail 16 which is driven downwardly through the tube should be of a length such that when driven home, i.e., when the head 42 is in substantial abutment with the upper end of the tube 20, the pointed end 18 of the nail will have curled outwardly as shown in FIG. 1. It will be noted that the point 18 of the nail is disposed substantially directly below the periphery of the large head 26. For a tube having a length of approximately 1⅓ inches and an outside diameter of ⁵⁄₃₂, nail 16 may be similar to a box nail 1⅝ inches in length with a shank diameter of approximately ¹⁄₁₆ of an inch and a head diameter of approximately ³⁄₁₆ of an inch. The head 26 of the tube 20 may be approximately 1 inch. A common wire box nail will be suitable for use with the tube.

In the earlier form of the anchor nail fastener, such as that shown in the co-pending application of Owen, moisture, rain water and the like would tend to leak downwardly around the nail 16 between it and the bore of the tube 20 and thereby gain access to the interior of the panel or board 10, or penetrate completely through the board to the underside thereof. Where tar or other substances were applied over a deck through which the anchor nails were driven, the hot tar either at the time of its application, or subsequently through the influence of solar heat, would tend to run down between the nail 16 and the tube 20 and spot the underside of the panel 10 or any covering that might be applied to the underside of the panel. To prevent such undesirable consequences, applicant has here provided means for sealing automatically the nail 16 in the tube 20. Such means comprises a gasket encircling the shank of the nail and bearing against the tube beneath the head of the nail and serving to seal the space around the nail shank and between such shank and the tube. The underside of the head 42 may exhibit small radially extending ribs 44 which result from the formation of the head of the nail. When the nail is driven downwardly through the tube, such ribs 44 come into contact with the upper end of the tube preventing flush seating of the underside of the head against the upper end of the tube. Through the space thereby provided between the underside of the head and the upper end of the tube, moisture, rain water, soft tar and the like may seep into the mouth of the tube. The gasket shown in FIG. 1 at 46, and more particularly in FIG. 3, prevents the ingress of the moisture, rain water, etc. This gasket is shown herein as being formed in situ as the nail 16 is driven into the tube. The gasket results from a coating of waterproof plastic or the like, such as an acrylic vinyl resin, which is strippably adhered to the shank of the nail. Such coating is shown in FIG. 2 at 48. It will resist moisture and tar and the like substances which are applied to or may be expected to contact the fastener. Such plastic coating need not and preferably is not a continuous coating. It might be characterized as a discontinuous coating with portions of the shank being substantially barren of the coating while other portions are provided with the coating. It might be characterized as being spotty. The coating may and preferably is applied to the nails by dipping them in a solution of the resin, withdrawing them and allowing the solution or coating to cure. The plastic should be relatively soft.

The bore 32 of the tube 20 is sized to closely fit about the shank of the nail 16, the fit being an interference fit so that as the nail is driven downwardly through the tube, the waterproof coating 48 will be stripped upwardly toward the head 42 of the nail accumulating at the mouth of the bore 32 of the tube and forming thereat the gasket 46.

To facilitate such stripping, the bore 32 is preferably constricted adjacent the mouth as at 50. Such constriction may be formed at the time the head 26 is applied to the tube and is the result of upsetting the metal of the tube at the mouth of he bore. The mouth of the bore as shown in FIG. 3 is outwardly beveled as at 52 with the constriction 50 being at the bottom or lower end of such mouth. As a consequence, the coating 48 being stripped from the shank of the nail will accumulate within the beveled mouth 52 in encircling engagement with the shank and beneath the head 42 to seal the shank at the mouth of the bore of the tube. In some cases, and depending upon the thickness of the coating 48, the plastic may tend to be extruded from beneath the head of the nail 42 as the nail is driven home in the tube. It has been found that where the nails are dipped as aforesaid, the amount of resin clinging to them will be sufficient to form a satisfactory gasket beneath the head 42 and in encircling engagement with the shank at the mouth 52 of bore 32 of the tube.

It has been further found that where the coating 48 is continuous rather than spotty or discontinuous, that the coating may serve to lubricate the passage of the nail within the tube and prevent satisfactory stripping of the coating at the constriction 50.

The gasket 46 thereby formed in situ about the nail shank serves to prevent seepage of moisture, rain water, tar or other foreign substances downwardly along the bore 32 of the tube and into the interior of the panel 10 or through the panel.

While the coating on the nail has been described as an acrylic vinyl resin, other plastics may be found suitable. When an acrylic vinyl resin is used, the nails are dipped in the fluid resin, removed therefrom and the resin allowed to cure thereon to a non-tacky condition. Suitable provisions may be taken to prevent the coated nails, prior to curing of the resin, from sticking together en masse.

It has been found that an acrylic vinyl coating on the nail when stripped upwardly to form a gasket as shown at 46 in FIG. 1, tends to expand if hot asphalt or roofing tar is applied to a roof through which the fastener extends, thereby further insuring a tight seal preventing the asphalt from running down through the fastener.

While the tube bore has been shown as being provided with a constriction 50 at the mouth of the bore, it will be understood that the constriction may be disposed spaced downwardly from the mouth to allow a nail to be more fully inserted in the bore before encountering the restriction.

The large head 26 at the upper end of the tube prevents the tube from being driven into the board 10 beyond the point shown in FIG. 1 when the nail 16 is driven home into the tube.

What is claimed is:

1. An anchor nail fastener comprising, in combination: a tube having upper and lower ends to be driven lower end first into a workpiece with a relatively large washer-like head secured to the upper end of the tube for limiting penetration of a workpiece, said tube provided adjacent its lower end with a side opening aperture, means within the tube adjacent the aperture for deflecting a nail driven downwardly into the tube laterally outwardly through the aperture, a nail having a shank sized to closely fit the bore of the tube for driving downwardly through the tube and having a length sufficiently greater than the distance between the upper end of the tube and said aperture whereby when the nail is fully driven into the tube a portion of the nail will project laterally from the aperture to anchor the nail and tube in the workpiece, a water-proof plastic strippably adhering to the shank of the nail, and said tube bore provided at its upper end with a mouth having an annular constriction therein for wiping the shank of the nail and stripping said plastic upwardly along the shank toward the head as the nail is driven into the tube to cause an accumulation of the plastic at the constriction forming in situ a gasket between the upper end of the tube and the underside of the head of the nail when the nail is fully driven into the tube.

2. The invention as defined in claim 1 characterized in that said relatively large washer-like head is secured to the upper end of the tube by an upset wall portion of the tube with the tube wall being inwardly deflected at such upset wall portion providing said annular constriction for wiping the strippable plastic on the nail shank upwardly toward the nail head.

3. The invention as defined in claim 1 characterized in that the mouth of the bore of the tube at the upper end thereof is outwardly beveled and said constriction is at the bottom of such beveled mouth whereby the coating stripped from the nail shank accumulates at such mouth beneath the nail head.

References Cited by the Examiner

UNITED STATES PATENTS

| | | | |
|---|---|---|---|
| 958,127 | 5/10 | Hovrud | 85—26 |
| 1,173,882 | 2/16 | Smith | 85—26 |
| 2,048,093 | 7/36 | Alpeters | 85—28 |
| 2,677,298 | 5/54 | Hebenstreit | 85—23 |
| 2,724,303 | 11/55 | Holcomb | 85—10.1 |

FOREIGN PATENTS

| | | |
|---|---|---|
| 663,604 | 4/29 | France. |
| 75,727 | 6/94 | Germany. |

EDWARD C. ALLEN, *Primary Examiner*.